United States Patent

[11] 3,569,663

| [72] | Inventor | Klas Bertil Weman<br>Laxa, Sweden |
|---|---|---|
| [21] | Appl. No. | 795,626 |
| [22] | Filed | Jan. 31, 1969 |
| [45] | Patented | Mar. 9, 1971 |
| [73] | Assignee | Elektriska Svetsningsaktiebolaget<br>Goteborg, Sweden |
| [32] | Priority | Feb. 8, 1968 |
| [33] | | Sweden |
| [31] | | 1638 |

[54] APPARATUS FOR AUTOMATIC ARC SPOT WELDING
9 Claims, 3 Drawing Figs.

[52] U.S. Cl. .................................................. 219/127,
219/131, 219/113
[51] Int. Cl. ..................................................... B23k 9/10
[50] Field of Search........................................... 219/130,
131, 127, 519, 113; 314/69—74; 318/333, 380

[56] References Cited
UNITED STATES PATENTS

| 3,013,144 | 12/1961 | Adamson et al. ............. | 219/127X |
| 3,397,323 | 8/1968 | Hirsch .......................... | 219/519X |

Primary Examiner—D. F. Duggan
Attorney—Cameron, Kerkam and Sutton

ABSTRACT: An arc spot welding operation initiated and sustained by feeding a fusible electrode towards a workpiece at substantially constant speed while supplying to the electrode a welding voltage provided by a constant-potential source. A DC current flows in a capacitor circuit for the duration of the welding current only (or, alternatively, for the duration of the welding arc only). The DC current is interrupted during transient interruptions of the welding current or during transient extinctions of the welding arc, and the electrode advancement is interrupted as soon as the capacitor voltage has reached a predetermined level.

APPARATUS FOR AUTOMATIC ARC SPOT WELDING

This invention relates to the arc welding art. More particularly, the invention relates to arc spot welding with a consumable electrode advanced towards the work at substantially constant speed and supplied with welding current by a welding power source of the constant-potential type.

In this kind of arc welding, the duration of the welding operation is short (generally within the range from some tenths of a second up to a few seconds) and requires rather precise adjustment according to the thickness of the work and other variables. It is, therefore, common practice to provide automatic means for extinguishing the arc by interrupting the electrode advancement after the passage of a predetermined, adjustable period. Said means include a timing circuit and means controlled by the timing circuit for stopping the electrode advancement at the end of a period measured out by the timing circuit. Apparatus have been provided in which the timing action of the timing circuit is initiated by the flow of current in the welding circuit. It has also been suggested to adapt the timing circuit to be initiated by the ignition of the arc, in order to prevent accidental variations of the time interval between the start of the flow of current in the welding circuit and the ignition of the arc from causing corresponding, undesirable variations of the are time. In practice, however, the performance of the apparatus of this type is still not always satisfactory. It may happen, for instance, that in a series of welds produced under apparently identical conditions some of the welds are unexceptionable while the remainder do not come up to the standard.

The invention has for its principal object to provide arc spot welding apparatus and an arc spot welding method capable of producing spot welds of a consistently uniform quality.

The invention is based on the discovery by the present inventor that the variations of the weld quality above referred to are largely caused by transient interruptions of the welding current which occur during the first moments of the welding operation. The gist of the invention resides in the concept of temporarily opening the timing circuit, and so temporarily checking the time-measuring action of the timing circuit, during the transient interruptions of the welding current referred to. Said checking of the time-measuring action of the time-circuit may be extended to intervals during which the welding circuit is short-circuited, that is, intervals during which a welding current flows but no arc exists.

Accordingly, the timing circuit in one form of the apparatus of the invention contains a switching member adapted to be controlled by the welding current so as to close the timing circuit whenever a welding current flows and open the timing circuit as soon as an open-circuit occurs in the welding circuit. In another form of the apparatus of the invention, the timing circuit contains switching means adapted to be controlled by the welding current and the welding voltage in such a way as to establish and maintain the closed condition of the timing circuit only when a flow of welding current and an arc voltage are present simultaneously.

The switching means provided according to the invention for controlling the timing circuit have to have a reasonably fast response. As a general rule, a response time of 10 milliseconds must not be exceeded. That is to say, the closing or opening of the timing circuit must follow upon the change of conditions in the welding circuit which causes said closing or opening with a delay not exceeding 10 milliseconds. The well-known so-called reed relays, the response time of which is of the order of 1 millisecond, are well suited for the purpose of the invention. It is also possible, for instance, to employ electronic switching means, which are known to provide very low response times.

A preferred method according to the invention for controlling the duration of the arc spot welding operation comprises the steps of causing a DC current to flow in a capacitor circuit for the duration of the welding current only, interrupting said DC current during any transient interruption of the welding current, and interrupting the electrode advancement as soon as the capacitor voltage has reached a predetermined level. Said method may, if desired, be modified so as to comprise the steps of causing the DC current to flow in the capacitor circuit for the duration of the welding arc only, interrupting the DC current during any transient extinction of the welding arc, and interrupting the electrode advancement as soon as the capacitor voltage has reached a predetermined level.

The invention is illustrated by way of example in the accompanying drawings, in which.

Figure 1:
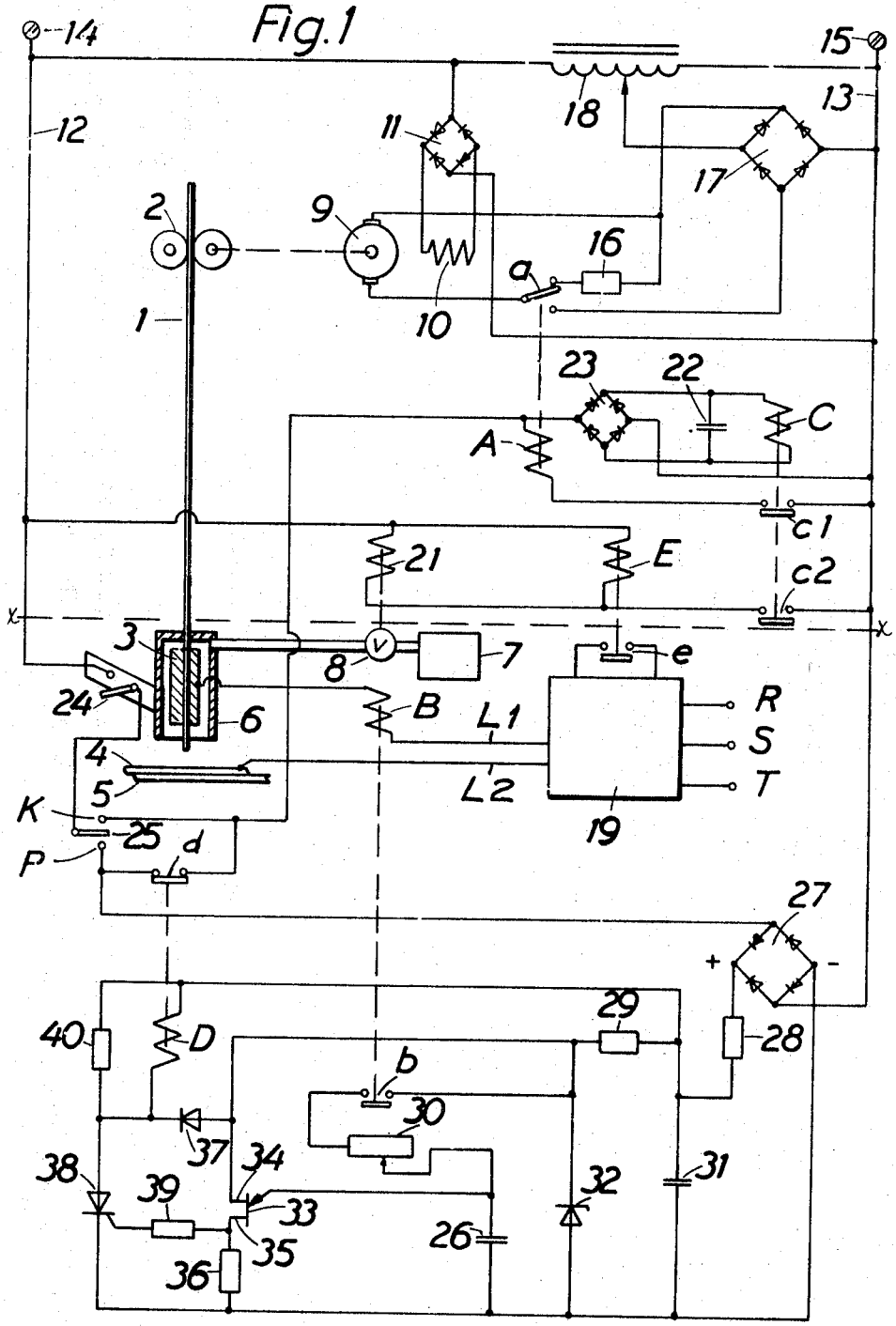
FIG. 1 is a schematic representation of an arc spot welding apparatus according to the invention.

In the apparatus shown in FIG. 1, a wire electrode 1 is advanced by rolls 2 driven by a motor 9 through a contact tube 3 towards metal sheets 4, 5 to be spot welded to each other. The contact tube is adapted to be maintained at a predetermined distance from the work by conventional means (not shown). A shielding gas nozzle 6 surrounding the contact tube is connected to a source 7 of shielding gas through a solenoid valve 8. The field winding 10 of the wire advancing motor 9 is connected to a rectifier bridge 11 the AC terminals of which are connected to the terminals 14, 15 of an AC source through bus bar conductors 12, 13. One brush of the motor is connected to the changeover contact $a$ of a relay A. In the nonoperated position shown, the changeover contact closes a braking circuit containing the armature of the motor in series with a resistor 16. In the operated position of the changeover contact $a$, the armature of the motor 9 is connected to the DC terminals of a rectifier bridge 17 the AC terminals of which are connected to the variable output voltage of an auto-transformer 18 connected to the AC bus bars 12, 13. The variable output voltage of the auto-transformer determines the rate of rotation of the motor 9, and, consequently, the rate of advance of the electrode. The source 19 of welding power may, for instance, be a transformer-rectifier unit connected to a 3-phase network R, S, T and having a slightly drooping load characteristic. One welding current conductor L1 is connected to the contact tube 3 through the winding of a welding current relay B. The other welding current conductor L2 is connected to the work 4, 5. The welding current relay is of a type which responds quickly to energization as well as to deenergization and preferably consists of a reed relay. This is a well-known type of relay principally characterized thereby that the contact members consist of magnetic material and also form parts of the magnetic circuit of the relay. The supply of welding power is controlled by a contactor E, the winding of which is connected in parallel to the winding 21 of the solenoid valve 8 and receives its energizing current from the bus bars 12, 13 through a circuit including the front contact (normally open contact) $c2$ of a start relay C. The winding of the start relay C is connected in parallel to a capacitor 22, which delays the dropping out of the relay, and is energized by a rectified current delivered by the rectifier bridge 23, the AC terminals of which are connected in a circuit from one bus bar 12 through a manual starting switch 24, a selector switch 25 in the position P, a back contact $d$ (normally closed contact) of a relay D and the rectifier bridge 23 to the other bus bar 13. In the following description, the selector switch 25 is assumed always to be in position P, which adapts the apparatus for spot welding. Position K adapts the apparatus for continuous welding.

The front contact $b$ of the welding current relay B closes the charging circuit of a capacitor 26. Said charging circuit extends from the positive terminal of a rectifier bridge 27 through the resistors 28 and 29, front contact $b$, the variable resistor 30 and the capacitor 26 to the negative terminal of the rectifier bridge 27. The AC terminals of the rectifier bridge are connected in a circuit from bus bar 12 through starting switch 24, selector switch 25 in position P, and the rectifier bridge 27 to the other bus bar 13. The resistor 28 and a capacitor 31 constitute a smoothing filter. The circuit branch consisting of the front contact $b$, the variable resistor 30 and the capacitor 26 is shunted by a Zener diode 32 serving to maintain a constant voltage across said branch during the charging of the capacitor. Two other circuit branches are connected in parallel with the Zener diode, to wit, one branch containing an unijunction transistor 33 in series with a resistor 36 and a second branch containing a diode 37 connected in series with a thyristor 38. Moreover, the thyristor 38 in series with the winding of the relay D shunted by a resistor 40 is connected directly across the smoothing capacitor 31. The positive terminal of the capacitor 26 is connected to the emitter of the unijunction transistor 33. One base (Base one) of the unijunction transistor 33 is connected to the control electrode of the thyristor 38 through a limiting resistor 39.

The unijunction transistor 33 as well as the thyristor 38 are nonconducting as long as the voltage of the capacitor 26 remains below the top voltage of the unijunction transistor. As soon as the capacitor voltage reaches said top value, the unijunction transistor is rendered conductive, resulting in the discharge of the capacitor through the resistor 36. The resulting voltage across the resistor 36 fires the thyristor 38, resulting in the energization of the relay D through a circuit from the positive terminal of the rectifier bridge 27 through the resistor 28, the winding of the relay D and the thyristor 38 to the negative terminal of the rectifier bridge 27. The voltage acting on the unijunction transistor 33 remains very small as long as the thyristor 38 is conductive. The unijunction transistor therefore remains in the conductive state sufficiently long to permit the voltage of the capacitor 26 to drop to a very low value.

The apparatus operates in the following way. The contact tube 3, which may for instance form part of a welding gun, is placed in the proper position with regard to the work, and the operator closes the starting switch 24. This results in the energizing of the start relay C through the circuit above described. The start relay closes its front contacts $c1$ and $c2$. The contact $c2$ closes the energizing circuit of the solenoid valve 8 and the contactor E, so that shielding gas is admitted to the nozzle 6 and the welding voltage is connected to the contact tube 3. The contact $c1$ closes the energizing circuit of the relay A, so that said relay moves its changeover contact $a$ to the front position in which the contact closes the armature circuit of the motor 9. The motor starts feeding the electrode 1 towards the work. As soon as the electrode contacts the work, the resulting short circuit current energizes the welding current relay B, resulting in the immediate closing of the charging circuit of the capacitor 26 through the quick-acting relay contact $b$. The charging of the capacitor causes the capacitor voltage to increase at a rate determined by the resistance value of the variable resistor 30. The heat developed by the short circuit current at the electrode tip ignites the welding arc. If the arc should go out during the capacitor charging period, resulting in a transient interruption of the welding current, the welding current relay B will drop off and open its contact $b$, so that the charging of the capacitor will be held up until the moment the relay B is operated again. Thus, the charging of the capacitor will go on during those periods only during which a current is flowing in the welding circuit. The resistor 30 is so adjusted that the time required for the capacitor voltage to rise to the top voltage of the unijunction transistor is equal to the time required for effecting a satisfactory spot weld at the welding conditions given. The adjustment member of the resistor 30 is preferably provided with a time scale directly indicating the charging time corresponding to the setting of the member. The time setting required for a given welding job may be taken from a table of settings established with the aid of experiments.

As soon as the voltage of the capacitor 26 is equal to the top voltage of the unijunction transistor, the unijunction transistor becomes conducting, so that the condenser is discharged through the circuit already described and the relay D operates. The back contact $d$ of the relay D opens the energizing circuit of the relays A and C. The relay A drops out immediately, whereby the changeover contact $a$ is moved to its back position, in which the contact closes the braking circuit of the motor 9. The resulting braking action quickly stops the motor. The relay C drops out with a certain delay, causing its front contact $c2$ to open the circuit of the solenoid valve winding 21 and the winding of contactor E. The solenoid valve 8 closes, and the contactor contact $e$ opens the welding circuit. The operator now can release the starting switch 24.

Figure 2:
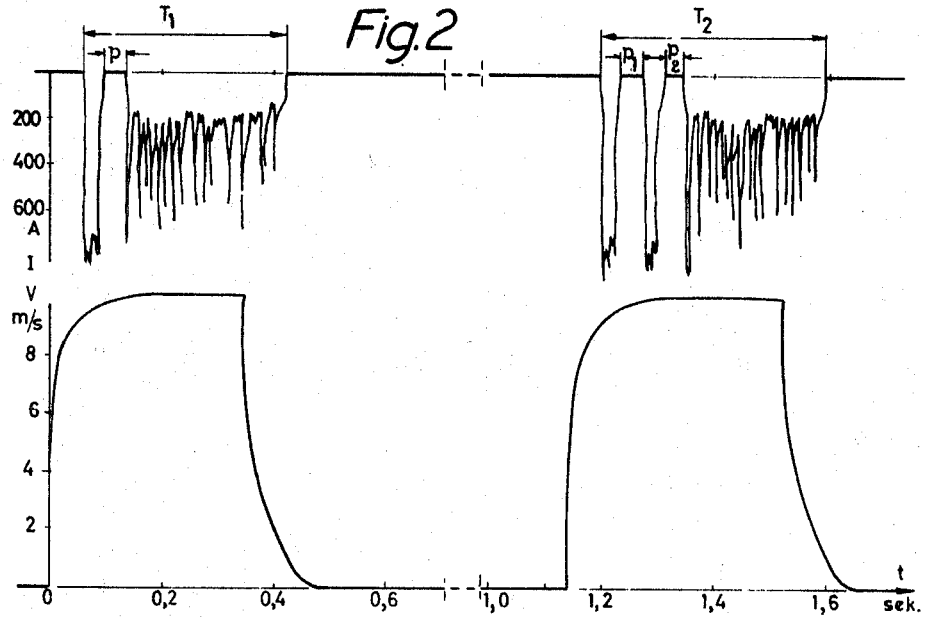
FIG. 2 shows oscillographic records of the welding current and the electrode advancing rate obtained with the apparatus according to FIG. 1.

FIG. 2 shows the variation of the welding current and the electrode advancing rate with the time during two separate tests. At the first test, a currentless interval $p$ occurred shortly after the ignition of the arc. At the second test, there occurred two successive currentless intervals $p1$ and $p2$. Due to the action of the timing device according to the invention, the "current times" $T_1 - p$ and $T_2 - (p1 + p2)$ are the same in both of the tests. The curves shown were obtained in spot welding a pair of sheets of mild steel having a thickness of 0.6 mm. The electrode consisted of mild steel wire of 0.8 mm. diameter. The welding power was provided by a transformer-rectifier unit having an open circuit DC voltage of 32 volts and a slightly drooping characteristic (0.04 volts/ampere).

Figure 3:
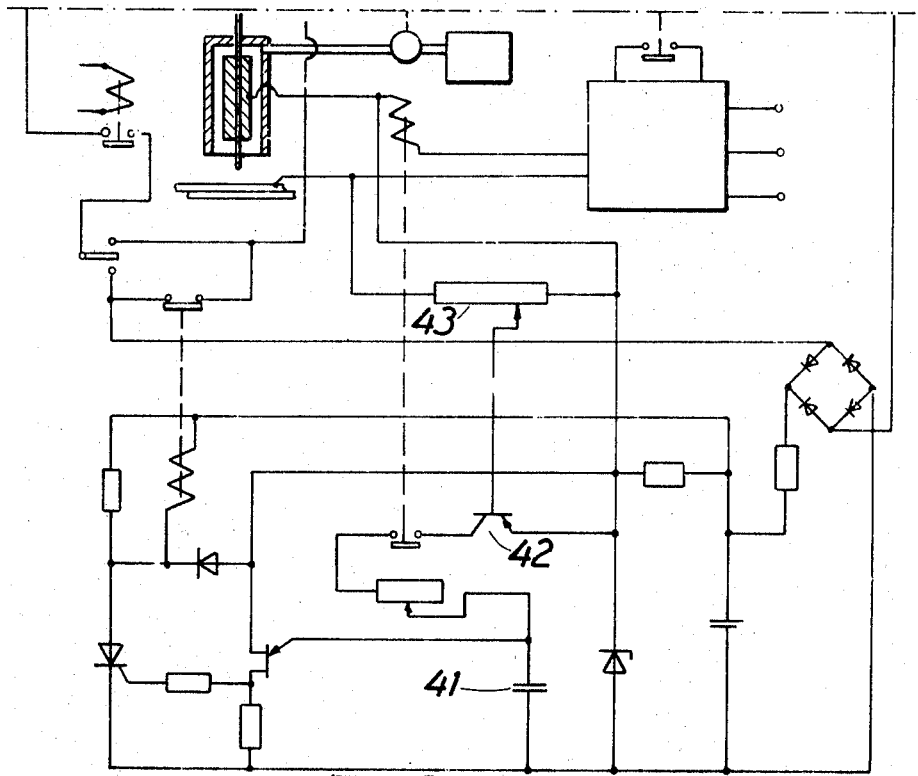
FIG. 3 shows a modified form of the part of the apparatus according to FIG. 1 which is below the line $x-x$ in FIG. 1.

In the modified apparatus represented in FIG. 3, the capacitor 41 has the same function as the capacitor 26 of FIG. 1. The charging circuit of the capacitor 41 contains, in addition to the elements described with reference to FIG. 1, a transistor 42 the emitter voltage of which is supplied by a potentiometer 43 connected to the welding voltage. The potentiometer is adjusted in such a way that the emitter voltage is at least equal to the threshold value when an arc voltage occurs between the electrode and the work. The transistor thus will remain in the nonconductive state until the arc voltage occurs in the welding circuit. Consequently, the current charging the capacitor 41 of the timing circuit will flow only in the case that a welding current is flowing and that there is an arc between the electrode and the work. The apparatus differs from the one of FIG. 1 in that not only the intervals in which no welding current is flowing but also the intervals in which no arc exists are excluded from the time measured by the timing circuit. The device of FIG. 3 thus constitutes an improvement on the one of FIG. 1. In practical tests, however, the apparatus represented in FIG. 1 has proved to yield quite satisfactory results, which seems to indicate that the short circuits were of short duration, or that the duration of the short circuits did not vary significantly from one test to another.

We claim:

1. A method of controlling the duration of an arc spot welding operation initiated and sustained by feeding a fusible electrode towards a workpiece at substantially constant speed while maintaining a welding voltage between the welding electrode and the workpiece, said welding voltage being provided by a welding power source of the constant-potential type, said welding operation being liable to transient interruptions of the welding current, comprising the steps of causing a DC current to flow in a capacitor circuit for the duration of the welding current only, interrupting said DC current during any transient interruption of the welding current, and interrupting the electrode advancement as soon as the capacitor voltage has reached a predetermined level.

2. A method of controlling the duration of an arc spot welding operation initiated and sustained by feeding a fusible electrode towards a workpiece at substantially constant speed while maintaining a welding voltage between the welding electrode and the workpiece, said welding voltage being provided by a welding power source of the constant-potential type, said welding operation being liable to transient extinctions of the welding arc, comprising the steps of causing a DC current to flow in a capacitor circuit for the duration of the welding arc only, interrupting said DC current during any transient extinction of the welding arc, and interrupting the electrode advancement as soon as the capacitor voltage has reached a predetermined level.

3. A method of controlling the duration of an arc spot welding operation initiated and sustained by feeding a fusible electrode towards a workpiece at substantially constant speed while maintaining a welding voltage between the welding electrode and the workpiece, said welding voltage being provided by a welding power source of the constant-potential type, said welding operation being liable to transient interruptions of the welding current, comprising the steps of causing a charging current to flow in a capacitor circuit comprising a capacitor connected in series with a resistor for the duration of the welding current only, interrupting said charging current during any transient interruption of the welding current, and interrupting the electrode advancement as soon as the capacitor voltage has risen to a predetermined level.

4. A method of controlling the duration of an arc spot welding operation initiated and sustained by feeding a fusible electrode towards a workpiece at substantially constant speed while maintaining a welding voltage between the welding electrode and the workpiece, said voltage being provided by a welding power source of the constant-potential type, said welding operation being liable to transient extinctions of the welding arc, comprising the steps of causing a charging current to flow in a capacitor circuit comprising a capacitor connected in series with a resistor for the duration of the welding arc only, said charging current being interrupted during any transient extinction of the welding arc, and interrupting the electrode advancement as soon as the capacitor voltage has risen to a predetermined level.

5. Apparatus for arc spot welding with a consumable electrode, comprising a welding power source of the constant-potential type, means for establishing a welding circuit including said welding power source, the electrode and the work, means for advancing the electrode towards the work at a substantially constant speed, and means for controlling the duration of the welding operation, said last-mentioned means comprising:
   a timing circuit;
   a switching member connected in said timing circuit;
   means for closing said switching member in response to the flow of welding current and opening said switching member in response to the interruption of the welding current; and
   means actuated by said timing circuit for rendering the electrode advancing means inactive at the end of an interval determined by said timing circuit.

6. Apparatus for arc spot welding with a consumable electrode, comprising a welding power source of the constant-potential type, a welding current switching means, means for establishing a welding circuit including said welding power source, a contact of said welding current switching means, the electrode and the work, means for advancing the electrode towards the work at substantially constant speed, means for controlling the duration of the welding operation, said last-mentioned means comprising:
   a timing circuit;
   a switching member connected in said timing circuit;
   means for closing said switching member in response to the flow of welding current and opening said switching member in response to the interruption of the welding current; and
   means actuated by said timing circuit for rendering the electrode advancing means inactive at the end of an interval determined by said timing circuit, and delayed-action means actuated by said timing circuit for causing said welding current switching means to open its contact.

7. Apparatus for arc spot welding with a consumable electrode, comprising a welding power source of the constant-potential type, means for establishing a welding circuit including said welding power source, the electrode and the work, means for advancing the electrode towards the work at substantially constant speed, and means for controlling the duration of the welding operation, said last-mentioned means comprising:
   a timing circuit;
   switching means in said timing circuit adapted to be controlled by the welding current and the welding voltage in such a way as to establish and maintain the closed condition of the timing circuit only when a flow of welding current and an arc voltage are present simultaneously; and
   means actuated by said timing circuit for rendering the electrode advancing means inactive at the end of an interval determined by said timing circuit.

8. Apparatus for arc spot welding with a consumable electrode, comprising a welding power source of the constant-potential type, means for establishing a welding circuit including said welding power source, the electrode and the work, means including an electric motor for advancing the electrode towards the work at substantially constant speed, a source of power for said motor, a braking resistor for said motor, a motor control relay having a changeover contact for connecting the armature of said motor either to the source of power or to the braking resistor, and means for controlling the duration of the welding operation, said last-mentioned means comprising:
   a timing circuit containing a capacitor in series with a charging resistor and a source of DC voltage;
   a welding current controlled relay having a front contact connected in series in said timing circuit;
   a discharge circuit for said capacitor comprising a discharge resistor and means responsive to a predetermined voltage across said capacitor for closing said discharge circuit; and
   switching means responsive to the voltage appearing across the discharge resistor on discharge of the capacitor for controlling said motor control relay to make said relay shift its changeover contact into the braking position on appearance of said last-mentioned voltage.

9. Apparatus as claimed in claim 8 which further comprises a switching member connected in the timing circuit in series with said front contact, said switching member being in the nonconductive state or position when not operated, and means responsive to the arc voltage for operating said switching member.